(12) United States Patent
Choi et al.

(10) Patent No.: US 11,928,111 B2
(45) Date of Patent: Mar. 12, 2024

(54) ELECTRONIC APPARATUS AND METHOD FOR CONTROLLING ELECTRONIC APPARATUS

(71) Applicant: SAMSUNG ELECTRONICS CO., LTD., Suwon-si (KR)

(72) Inventors: Yoonjung Choi, Suwon-si (KR); Jisang Yu, Seoul (KR); Hyojung Han, Suwon-si (KR); Jonghyun Kim, Suwon-si (KR); Hejung Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/739,453

(22) Filed: May 9, 2022

(65) Prior Publication Data

US 2022/0284018 A1    Sep. 8, 2022

Related U.S. Application Data

(63) Continuation of application No. PCT/KR2021/012848, filed on Sep. 17, 2021.

(30) Foreign Application Priority Data

Mar. 3, 2021   (KR) ........................ 10-2021-0028283

(51) Int. Cl.
   *G06F 16/2452*    (2019.01)
   *G06N 3/02*    (2006.01)

(52) U.S. Cl.
   CPC ........... *G06F 16/2452* (2019.01); *G06N 3/02* (2013.01)

(58) Field of Classification Search
   CPC .. G06F 16/2452; G06F 40/216; G06F 40/289; G06F 40/30; G06F 40/35;
   (Continued)

(56) References Cited

U.S. PATENT DOCUMENTS

| 8,140,322 B2 | 3/2012 | Simonsen et al. |
| 2012/0209589 A1 | 8/2012 | Baek et al. |

(Continued)

FOREIGN PATENT DOCUMENTS

| CN | 111666775 A | 9/2020 |
| JP | 2019185392 A | 10/2019 |

(Continued)

OTHER PUBLICATIONS

Fader, Paraphrase-Driven Learning for Open Question Answering, pp. 1608-1618 (Year: 2013).*

(Continued)

*Primary Examiner* — Albert M Phillips, III
(74) *Attorney, Agent, or Firm* — Sughrue Mion, PLLC

(57) ABSTRACT

A method for controlling an electronic apparatus includes: translating a first query text of a first language to acquire a second query text of a second language; transmitting the second query text to an external device; acquiring, from the external device, a first response text of the second language in response to the second query text; acquiring a second response text acquired by translating the first response text into the first language, and identifying whether the second response text semantically matches to the first query text by inputting the second response text and the first query text into a first neural network model configured to identify whether a query and a response semantically match; and acquiring a third query text of the second language by retranslating the first query text based on a result of identifying that the first query text and the second response text do not semantically match.

11 Claims, 16 Drawing Sheets

(58) Field of Classification Search
CPC .......... G06F 40/44; G06F 40/58; G06N 3/02; G06N 3/045; G06N 3/08
See application file for complete search history.

(56) References Cited

U.S. PATENT DOCUMENTS

| | | | |
|---|---|---|---|
| 2014/0172411 A1 | 6/2014 | Kim et al. | |
| 2015/0199340 A1 | 7/2015 | Kwon et al. | |
| 2016/0110350 A1 | 4/2016 | Waibel | |
| 2018/0336198 A1* | 11/2018 | Zhong | G06N 7/01 |
| 2021/0112178 A1* | 4/2021 | Perone | G06N 3/044 |
| 2021/0264902 A1* | 8/2021 | Larson | G06F 40/35 |
| 2022/0180056 A1* | 6/2022 | Hong | G06F 9/547 |

FOREIGN PATENT DOCUMENTS

| | | | |
|---|---|---|---|
| KR | 1020120092488 A | 8/2012 | |
| KR | 1020140079598 A | 6/2014 | |
| KR | 1020150085145 A | 7/2015 | |
| KR | 1020150095061 A | 8/2015 | |
| KR | 1020200064972 A | 6/2020 | |

OTHER PUBLICATIONS

Jia, Q., et al., "Matching Questions and Answers in Dialogues From Online Forums", arXiv:2005.09276v2 [cs.CL], Aug. 3, 2020, 8 pages.
International Search Report (PCT/ISA/210) and Written Opinion (PCT/ISA/237) dated Dec. 16, 2021 issued by the International Searching Authority in International Application No. PCT/KR2021/012848.

* cited by examiner

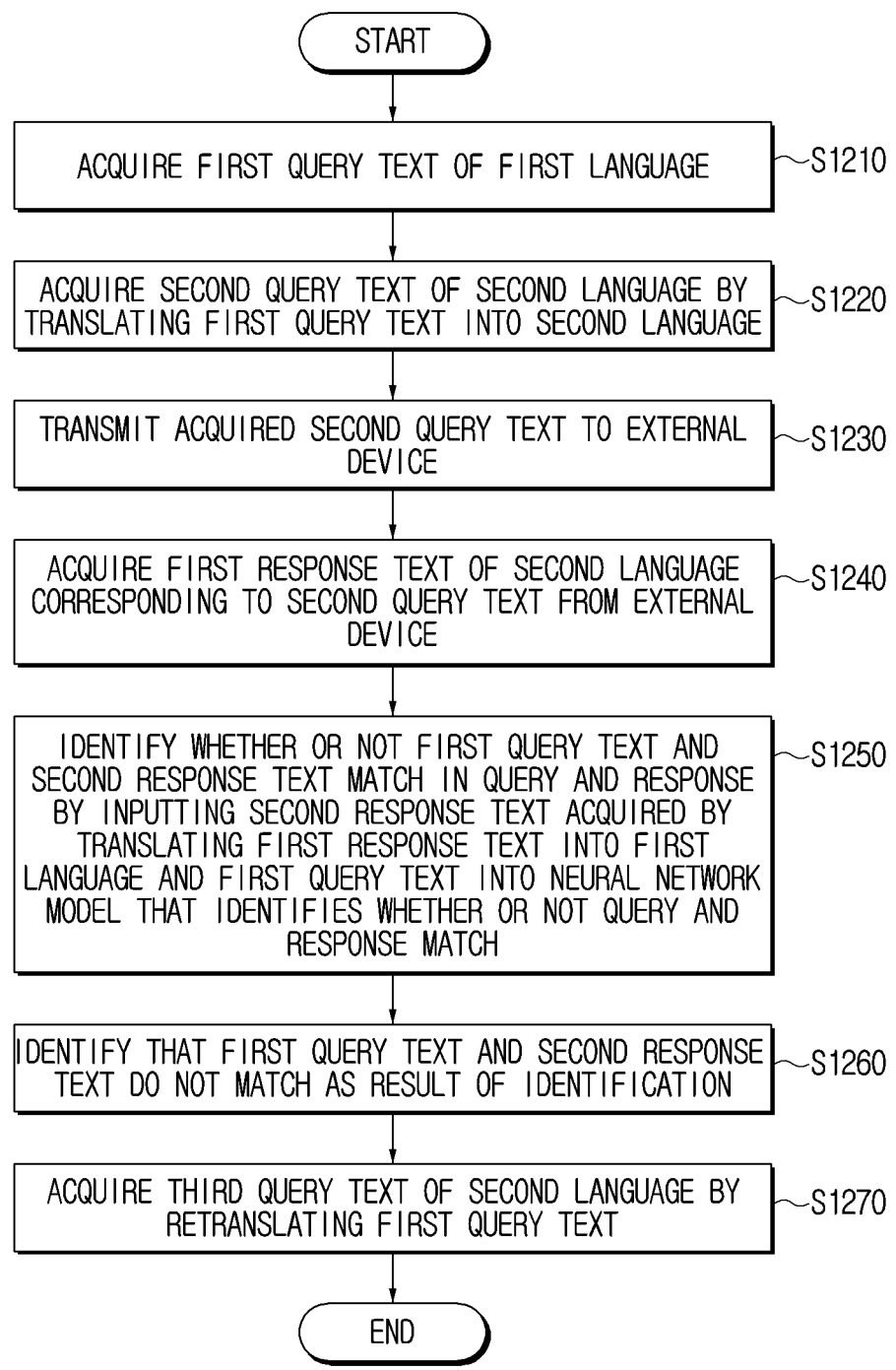

ELECTRONIC APPARATUS AND METHOD FOR CONTROLLING ELECTRONIC APPARATUS

CROSS-REFERENCE TO RELATED APPLICATION

This application is a bypass continuation of International Application No. PCT/KR2021/012848, filed on Sep. 17, 2021, which is based on and claims priority to Korean Patent Application No. 10-2021-0028283, filed on Mar. 3, 2021, in the Korean Intellectual Property Office, the disclosures of which are incorporated by reference herein in their entireties.

TECHNICAL FIELD

Apparatuses and methods consistent with the disclosure relate to an electronic apparatus and a method for controlling the same, and more particularly, to an electronic apparatus that performs retranslation of a query text based on a response text to the query text, and a method for controlling the same.

BACKGROUND ART

In recent years, an artificial intelligence system is used in various fields. In particular, the artificial intelligence system is also widely used in the field of translating various languages.

In the related art, there is a conversation system for performing a conversation between a user of a first language and a user of a second language. That is, the related art conversation system provides a service that enables conversation between users using different languages by using a translation model for translating a first language into a second language and a translation model for translating the second language into the first language.

However, in the related art, when a translation result of a query of the first language through the translation model does not match the intention of a questioner, there is a problem that a respondent responded differently from the query intention of the questioner.

TECHNICAL SOLUTION

The disclosure provides an electronic apparatus that performs retranslation of a query based on a response to the query text, and a method for controlling the same.

According to an embodiment of the disclosure, a method for controlling an electronic apparatus includes translating a first query text of a first language to acquire a second query text of a second language; transmitting the acquired second query text to an external device; acquiring, from the external device, a first response text of the second language in response to the second query text; acquiring a second response text acquired by translating the first response text into the first language, and identifying whether the second response text semantically matches to the first query text by inputting the second response text and the first query text into a first neural network model configured to identify whether a query and a response semantically match; and acquiring a third query text of the second language by retranslating the first query text based on a result of identifying that the first query text and the second response text do not semantically match.

The acquiring the third query text may include: identifying a first number of queries included in the first query text and a second number of queries included in the second query text, based on the result of identifying that the first query text and the second response text do not semantically match; based on a result of identifying that the first number is different from the second number, acquiring a fourth query text of the first language by dividing the first query text based on the first number of queries included in the first query text; and acquiring the third query text by translating the fourth query text into the second language.

The first number and the second number may be identified by respectively inputting the first query text and the second query text into a second neural network model configured to identify a number of queries included in a query text, and the second neural network model may be further configured to perform learning by using a learning text including a plurality of queries as input data, and a number of queries included in the input learning text as output data.

The fourth query text of the first language may be acquired by inputting the first query text into a sentence division model configured to divide a query text such that divided query texts respectively correspond a number of queries included in the query text; and the sentence division model may be further configured to perform learning by using a learning query text of the first language and information on a number of queries included in the learning query text as input data, and a learning query text obtained by division to correspond to the number of queries included in the learning query text as output data.

The method may further include acquiring the third query text of the second language, which is semantically different from the second query text, by translating the first query text into the second language, based on a result of identifying that the first number is equal to the second number, and the third query text may be a posterior translation result of the second query text.

The second query text of the second language may be acquired by inputting the first query text into a first translation model configured to translate the first language into the second language, the second query text may be a highest priority translation result of the first translation model, and the third query text may be a posterior translation result of the first translation model.

The method may further include: acquiring a fifth query text of the first language in which the first query text is paraphrased by inputting the first query text into a paraphrase model configured to generate a paraphrased query text, based on a result of identifying that the first number is equal to the second number; and acquiring the third query text by translating the fifth query text into the second language.

The paraphrase model may be further configured to perform learning by using a learning text of the first language as input data, and a text of the first language having a query intention that is same as a query intention of the input learning text as an output text.

The method may further include further displaying the first query text and the second query text on a display of the electronic apparatus, and the acquiring the first response text and the acquiring the second response text may include displaying the first response text and the second response text on the display, and the acquiring the third query text of the second language may include displaying the third query text on the display.

According to an embodiment of the disclosure, an electronic apparatus includes: a communication interface; a memory configured to store at least one instruction; and a processor configured to execute the at least one instruction stored in the memory to: translate a first query text of a first language to acquire a second query text of a second language; control the communication interface to transmit the acquired second query text to an external device; control the communication interface to receive, from the external device, a first response text of the second language in response to the second query text; acquire a second response text acquired by translating the first response text into the first language, and identify whether the second response text semantically matches to the first query text by inputting the second response text and the first query text into a first neural network model configured to identify whether a query and a response semantically match; and acquiring a third query text of the second language by retranslating the first query text based on a result of identifying that the first query text and the second response text do not semantically match.

The processor may be further configured to: identify a first number of queries included in the first query text and a second number of queries included in the second query text, respectively, based on a result of identifying that the first query text and the second response text do not semantically match; based on a result of identifying that the first number is different from the second number, acquire a fourth query text of the first language by dividing the first query text based on the first number of queries included in the first query text; and acquire the third query text by translating the fourth query text into the second language.

The processor may be further configured to identify the first number and the second number, by respectively inputting the first query text and the second query text into a second neural network model configured to identify a number of queries, and the second neural network model may be further configured to perform learning by using a learning text including a plurality of queries as input data, and a number of queries included in the input learning text as output data.

The processor may be further configured to acquire the fourth query text of the first language by inputting the first query text into a sentence division model configured to divide a query text such that divided query texts respectively correspond to a number of queries included in the query text, and the sentence division model may be further configured to perform learning by using a learning query text of the first language and information on a number of queries included in the learning query text as input data, and a learning query text obtained by division to correspond to the number of queries included in the learning query text as output data.

The processor may be further configured to acquire the third query text of the second language, which is semantically different from the second query text, by translating the first query text into the second language, based on a result of identifying that the first number is equal to the second number, and the third query text may be a posterior translation result of the second query text.

The processor may be further configured to acquire the second query text of the second language by inputting the first query text into a first translation model configured to translate the first language into the second language, and the second query text may be a highest priority translation result of the first translation model, and the third query text may be a posterior translation result of the first translation model.

According to the embodiments described above, an electronic apparatus may improve the accuracy of translation by performing and providing retranslation of a query according to whether a response to the query is matched to the intention of the query.

BRIEF DESCRIPTION OF DRAWINGS

FIG. 12 is a flowchart for describing a method for controlling an electronic apparatus according to an embodiment of the disclosure.

DETAILED DESCRIPTION

Hereinafter, the disclosure will be described in detail with reference to the accompanying drawings.

Figure 1:
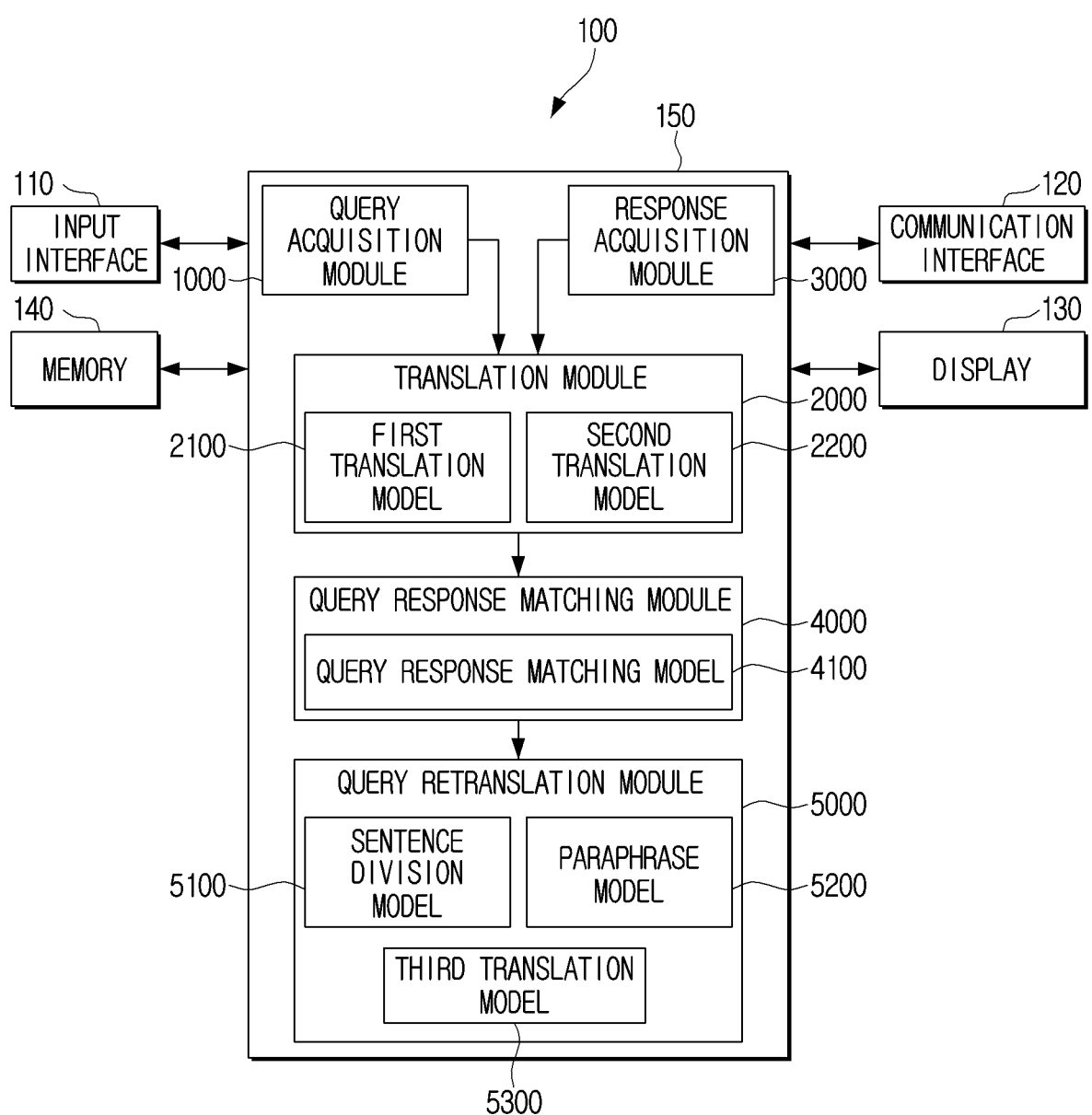
FIG. 1 is a block diagram for describing a configuration of an electronic apparatus according to the disclosure.

FIG. 1 is a block diagram for describing a configuration of an electronic apparatus according to the disclosure.

Referring to FIG. 1, an electronic apparatus 100 may include an input interface 110, a communication interface 120, a display 130, a memory 140, and a processor 150. The electronic apparatus 100 according to the disclosure may be implemented as various forms of electronic apparatuses such as, for example but not limited to, a smartphone, an augmented reality (AR) glass, a tablet personal computer (PC), a mobile phone, an image phone, an e-book reader, a TV, a desktop PC, a laptop PC, a netbook computer, and a smart watch.

The input interface 110 is a component for receiving an input of a user of the electronic apparatus 100. As an example, the input interface 110 may include a physical button for receiving the input of the user, or may be implemented in the form of a touch screen that detects a touch of the user. As an example, when the physical button is touched by the user, the input interface 110 may receive the input of the user corresponding to the physical button. In addition, when the touch screen is touched by the user, the input interface 110 may receive the input of the user.

In addition, the input interface 110 may further include a voice recognition sensor for recognizing a voice of the user. As an example, the voice recognition sensor may include a microphone, and the input interface 110 may receive the input of the user by receiving the voice of the user from the microphone. However, the input interface 110 is not limited to the examples described above, and may include various configurations capable of interacting with the user to receive the input of the user.

The communication interface 120 is a component for performing communication with external devices. Meanwhile, the communication connection between the communication interface 120 and the external device may include communicating through a third device (e.g., a repeater, a hub, an access point, a server, or a gateway).

As an example of the disclosure, the communication interface 120 may transmit a second query text of a second language in which a first query text of a first language is translated to the external device, and may acquire a first response text of the second language corresponding to the second query text from the external device. Here, the external device may be implemented as an electronic device such as, for example but not limited to, a tablet PC, a wearable device, a TV, or a smart phone, or an external server.

The communication interface 120 may perform communication with the external device through wireless communication or wired communication. As an example, the wireless communication may include, for example but not limited to, a cellular communication that uses at least one of long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM). According to an embodiment, the wireless communication may include, for example but not limited to, at least one of wireless fidelity (WiFi), Bluetooth, Bluetooth low power (BLE), Zigbee, near field communication (NFC), magnetic secure transmission, radio frequency (RF), or a body area network (BAN). The wired communication may include, for example but not limited to, at least one of universal serial bus (USB), high definition multimedia interface (HDMI), recommended standard 232 (RS-232), power line communication, or plain old telephone service (POTS). The network in which wireless communication or wired communication is performed may include at least one of a telecommunication network, for example, a computer network (e.g., LAN or WAN), the Internet, or a telephone network.

The display 130 may display various types of information according to the control of the processor 150. The display 130 may be implemented as various types of displays such as, for example but not limited to, a liquid crystal display panel (LCD), a light emitting diode (LED), an organic light emitting diode (OLED), a liquid crystal on silicon (LCoS), and digital light processing (DLP). In addition, the display 130 may also include a driving circuit, a backlight unit, and the like which may be implemented in the form of an a-si TFT, a low temperature poly silicon (LTPS) TFT, and an organic TFT (OTFT).

In addition, the display 130 may be combined with a touch panel to be implemented as a touch screen. However, this is only an example, and the display 130 may be implemented in various forms.

In particular, the display 130 may display a query text and a response text corresponding to the query text received from the external device on the display 130. In addition, as will be described later, a text acquired by retranslating the query text may be displayed on the display 130 based on the response text corresponding to the query text.

The memory 140 may store various programs and data necessary for an operation of the electronic apparatus 100. Specifically, the memory 140 may store at least one instruction. The processor 150 may perform the operation of the electronic apparatus 100 by executing the instruction stored in the memory 140.

The memory 140 may be implemented as, for example but not limited to, a non-volatile memory, a volatile memory, a flash-memory, a hard disc drive (HDD), a solid state drive (SSD), or the like. The memory 140 is accessed by the processor 150, and data read, write, edit, delete, and/or update by the processor 150 may be performed. In the disclosure, a term "memory" includes the memory 140, a read only memory (ROM) (not illustrated) in the processor 150, a random access memory (RAM) (not illustrated), or a memory card (not illustrated) (e.g., a micro secure digital (SD) card or a memory stick) mounted in the electronic apparatus 100. In addition, the memory 140 may store programs and data for configuring a variety of screens to be displayed on a display region of the display.

The processor 150 may be electrically connected to the memory 140 to control an overall operation and function of the electronic apparatus 100.

The processor 150 may be configured as one or a plurality of processors. In this case, the processor 150 may be a general-purpose processor such as a central processing unit (CPU), an application processor (AP), or the like, a graphic dedicated process such as a graphic processing unit (GPU), a vision processing unit (VPU), or the like, or an artificial intelligence dedicated processor such as a neural processing unit (NPU).

One or the plurality of processors perform a control to process input data according to predefined operating rules or artificial intelligence models stored in the memory 140. The predefined operating rules or artificial intelligence models are characterized by being created through learning. Here, the predefined operating rules or artificial intelligence models being created through learning refer to the predefined operating rules or artificial intelligence models having desired characteristics being created by applying learning algorithms to a large number of learning data. Such learning may be performed in a device itself in which the artificial intelligence according to the disclosure is performed, or may also be performed through a separate server and/or system.

The artificial intelligence model may include a plurality of neural network layers. Each layer has a plurality of weight values, and a layer calculation is performed by calculating a calculation result of a previous layer and the plurality of weight values. Examples of the neural network include a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks, and the neural network in the disclosure is not limited to the examples described above except as otherwise specified.

The processor 150 may drive an operating system or an application program to control hardware or software components connected to the processor 150 and to perform various kinds of data processing and calculation. In addition, the processor 150 may load a command or data received from at least one of other components on a volatile memory to process the command or data, and store various kinds of data in a non-volatile memory.

In the related art, when a query text is translated differently from the intention of a questioner, there is a problem in that a respondent provides a response text that does not match a query intention.

Figure 2:
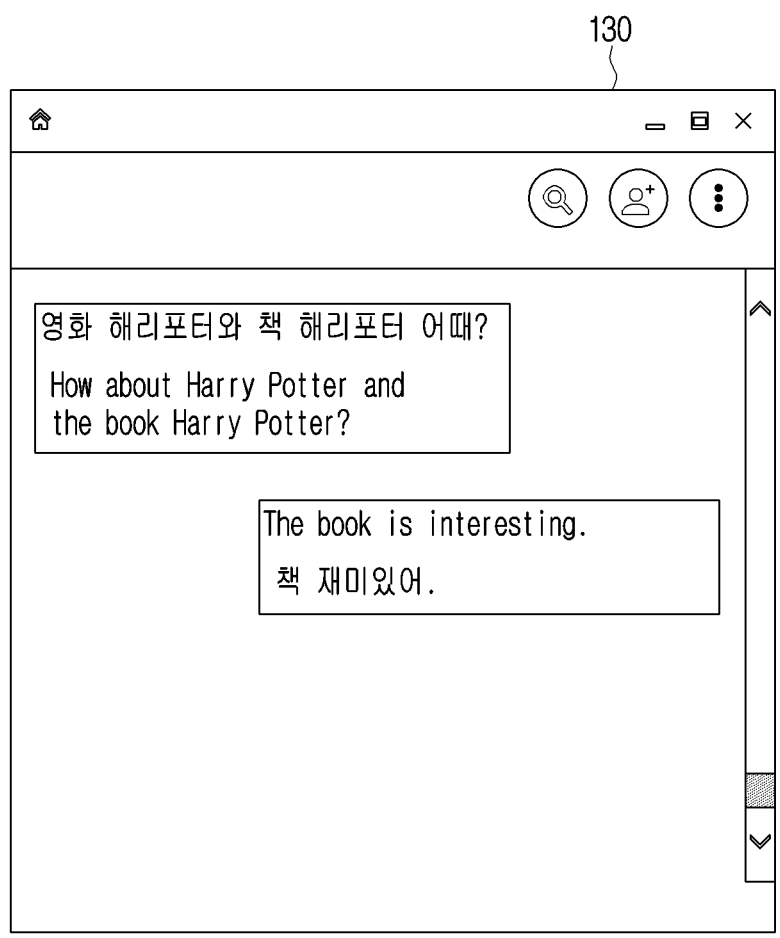
FIG. 2 is a diagram for describing a conversation system using a general translation technique.

As an example, referring to FIG. 2, the electronic apparatus 100 may translate a query text in a first language, which is intended for "How about the movie Harry Potter and the book Harry Potter?" into a query text of "How about Harry Potter and the book Harry Potter?" in a second language (e.g., English), and may provide the query text of "How about Harry Potter and the book Harry Potter?" of the second language. In addition, the electronic apparatus 100 may acquire a response text of "The book is interesting." in a second language from an external device. That is, in the related art, when the number of query texts in the first language is two, but the number of queries is translated into one query during the translation process as illustrated in FIG. 2, only the response text for one query may be acquired.

Figure 3:
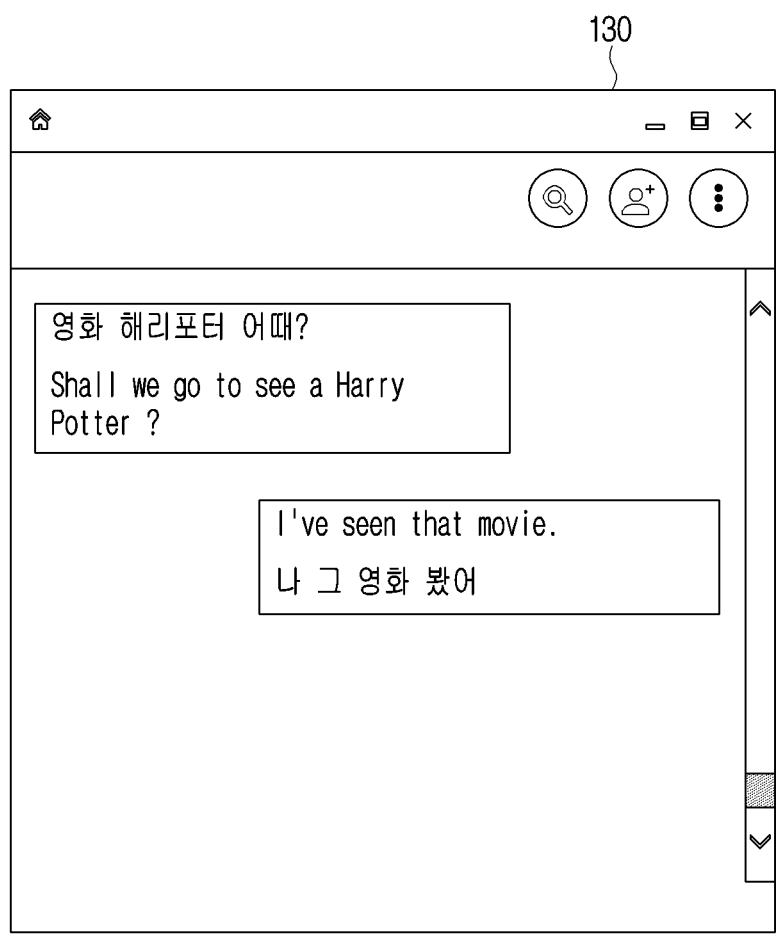
FIG. 3 is a diagram for describing a conversation system using a general translation technique.

As an example, referring to FIG. 3, the electronic apparatus 100 may translate a query text in a first language, which is intended for "What do you think about the movie Harry Potter?", into a query text of "Shall we go to see a Harry Potter?" of a second language, and may provide the query text of "Shall we go to see a Harry Potter?" in the second language. In addition, the electronic apparatus 100 may acquire a response text of "I've seen that movie" in a second language from an external device. That is, in the related art, the translation is performed differently from the query intention of the query text in the first language during the translation process as illustrated in FIG. 3, such that a response text different from the query intention may be acquired.

Accordingly, the electronic apparatus 100 according to the disclosure may provide a retranslation function for retranslating the query text based on the response text corresponding to the query text. The retranslation function according to the disclosure may be implemented through a query acquisition module 1000, a translation module 2000, a response acquisition module 3000, a query response matching module 4000, and a query retranslation module 5000 as illustrated in FIG. 1, and the respective modules may be stored in the memory 140. As an example, the electronic apparatus 100 may execute the retranslation function according to the disclosure, when a conversation system function for performing a conversation between a user of a first language and a user of a second language is executed.

When the retranslation function is executed, a plurality of modules 1000 to 5000 may be loaded into a memory (e.g., a volatile memory) included in the processor 150. That is, when the retranslation function is executed, the processor 150 may load the plurality of modules 1000 to 5000 from the non-volatile memory to the volatile memory of the processor 150 to execute the respective functions of the plurality of modules 1000 to 5000. The loading refers to an operation of calling and storing data stored in the non-volatile memory into the volatile memory so that the processor 150 may access the data.

As an example according to the disclosure, as illustrated in FIG. 1, the retranslation function may be implemented through the plurality of modules 1000 to 5000 stored in the memory 140, but is not limited thereto, and the retranslation function may be implemented in an external server.

The plurality of modules 1000 to 5000 according to the disclosure may be implemented with respective software, but are not limited thereto, and some modules may be implemented with a combination of hardware and software. As another example, the plurality of modules 1000 to 5000 may be implemented with one piece of software. In addition, some modules may be implemented in the electronic apparatus 100, and some other modules may be implemented in the external server.

The query acquisition module 1000 is a component for acquiring a query text. Specifically, the query acquisition module 1000 may acquire the text of the first language through the input interface 110. That is, as described above, the query acquisition module 1000 may acquire the text of the first language through a user input to the touch screen or a user's voice input.

In addition, when the text of the first language is acquired, the query acquisition module 1000 may identify whether the corresponding text is a query text. As an example, the query acquisition module 1000 may identify whether the text is a query text through a query identification model for identifying whether the text includes a query. As an example, the query identification model may be implemented as a neural network model, and learning may be performed through learning data labeled with whether a query is included in a target text of the first language. However, the disclosure is not limited thereto, and whether the text is a query text may be identified by various algorithms capable of identifying whether the text is a query text. If the text of the first language is identified as the query text, the query acquisition module 1000 may identify the corresponding text as a first query text.

As an example, if the text is identified as the query text, the query acquisition module 1000 may store the identified query text in a Question database (DB) of the memory 140. The Question DB according to the disclosure may be a DB for matching a query text and a response text corresponding to the query text.

In addition, the query acquisition module 1000 may provide the first query text of the first language to the translation module 2000.

The translation module 2000 is a component for translating a text of a first language into a second language and translating a text of a second language into a first language.

When the first query text of the first language is acquired through the query acquisition module 1000, the translation module 2000 may input the first query text of the first language into a first translation model 2100 for translating the first language into the second language, and acquire a second query text of the second language. According to the disclosure, the first translation model 2100 may be implemented as a neural machine translation (NMT) model for outputting a result of translating the first language into the second language when the text of the first language is input. Specifically, the first translation model 2100 may perform learning by using a plurality of texts of a first language as input data and a translation text of a second language for the input data as output data.

As an example, when the second query text is acquired, the processor 150 may match the second query text with the first query text and store it in the Question DB.

In addition, the processor 150 may transmit the second query text of the second language acquired through the translation module 2000 to an external device through the communication interface 120. In addition, the response acquisition module 3000 to be described later may acquire a first response text of a second language corresponding to the second query text from the external device through the communication interface 120.

When the first response text of the second language corresponding to the second query text is acquired through the response acquisition module 3000, the translation module 2000 may input the first response text of the second language into a second translation model 2200 for translating the second language into the first language, and acquire a second response text of the first language. According to the disclosure, the second translation model 2200 may be implemented as a neural machine translation (NMT) model for outputting a result of translating the second language into the first language when the text of the second language is input. Specifically, the second translation model 2200 may perform learning by using a plurality of texts of a second language as input data and a translation text of a first language for the input data as output data.

In addition, when the second response text of the first language is acquired through the second translation model 2200, the translation module 2000 may provide the first query text and the second response text to the query response matching module 4000.

The response acquisition module 3000 is a component for acquiring a response text corresponding to the query text. Specifically, the response acquisition module 3000 may acquire the first response text of the second language corresponding to the second query text of the second language through the communication interface 120.

That is, the response acquisition module 3000 may acquire a text of the second language through the communication interface 120 and identify whether the acquired text is the first response text corresponding to the second query text.

As an example, the response acquisition module 3000 may identify a first response text corresponding to the first and second query texts stored in the Question DB of the memory 140 among texts of the second language acquired through the communication interface 120. In addition, the response acquisition module 3000 may associate the first and second query texts and the first response text corresponding to the first and second query texts together and store them in the Question DB. As an example, when the text is acquired from the external device that has transmitted the second query text, the response acquisition module 3000 may identify the corresponding text as the first response text corresponding to the first and second query texts.

When the first response text corresponding to the second query text is acquired, the response acquisition module 3000 may provide a first response text of the second language to the translation module 2000. In addition, as described above, the translation module 2000 may acquire a second response text of the first language by translating the first response text through the second translation model 2200.

The query response matching module 4000 is a component for identifying whether a query of the first query text and a response of the second response text are matched.

Specifically, the query response matching module 4000 may identify whether the query of the first query text and the response of the second response text are matched by using a query response matching model 4100 for identifying whether the query and the response match (e.g., whether the response semantically matches or conforms to the intention of the query). The query response matching model 4100 is a neural network model that receives a query text and a response text together and outputs whether a response to a query is matched, and may also be referred to as a question answering (QA) model.

As an example, the query response matching model 4100 may perform learning by setting the query text and the response text corresponding to the query text as learning data, and setting information indicating that the input query text and response text are matched as output data when the response text corresponding to the input query text is input. In addition, when a response text that does not correspond to the input query text is input, the query response matching model 4100 may perform learning by setting information indicating that the input query text and response text do not match as output data.

In addition, the query response matching model 4100 according to the disclosure may perform learning so that a query text including a plurality of queries and a response text are input together, and it is identified whether the input response text includes a response corresponding to each of the plurality of queries included in the input query text. As an example, when a query text including two queries and a response text including one response are input to the query response matching model 4100, information indicating that the input query text and response text do not match may be output.

When it is identified that the first query text and the second response text are matched through the query response matching model 4100, the query response matching module 4000 may delete information on the first and second query texts and the second response text identified as being matched in the Question DB.

In addition, when it is identified that the first query text and the second response text are not matched through the query response matching model 4100, the query response matching module 4000 may provide the first query text of the first language and the second query text of the second language to a query retranslation module 5000.

The query retranslation module 5000 is a component for retranslating the first query text.

When it is identified that the first query text and the second response text do not match through the query response matching model 4100, the query retranslation module 5000 may acquire a third query text of a second language by retranslating the first query text.

As a first example, when the first query text includes two or more queries, the query retranslation module 5000 may acquire a fourth query text of a first language by dividing the first query text into query texts corresponding to the number of queries.

Specifically, the query retranslation module 5000 may identify the number of queries of the first query text and the number of queries of the second query text. As an example, the query retranslation module 5000 may identify the number of queries of the query text by using a neural network model for identifying the number of queries of the query text. As an example, the neural network model for identifying the number of queries of the query text may perform learning by setting a learning text including a plurality of queries as an input text and the number of queries of the input learning text as an output text. However, the disclosure is not limited thereto, and the number of queries may be identified through various methods for identifying the number of queries of the query text.

When it is identified that the number of queries of the first query text and the number of queries of the second query text are the same, the query retranslation module 5000 may retranslate the first query text using at least one of a paraphrase model 5200 and a third translation model 5300 to be described later.

Figure 4:
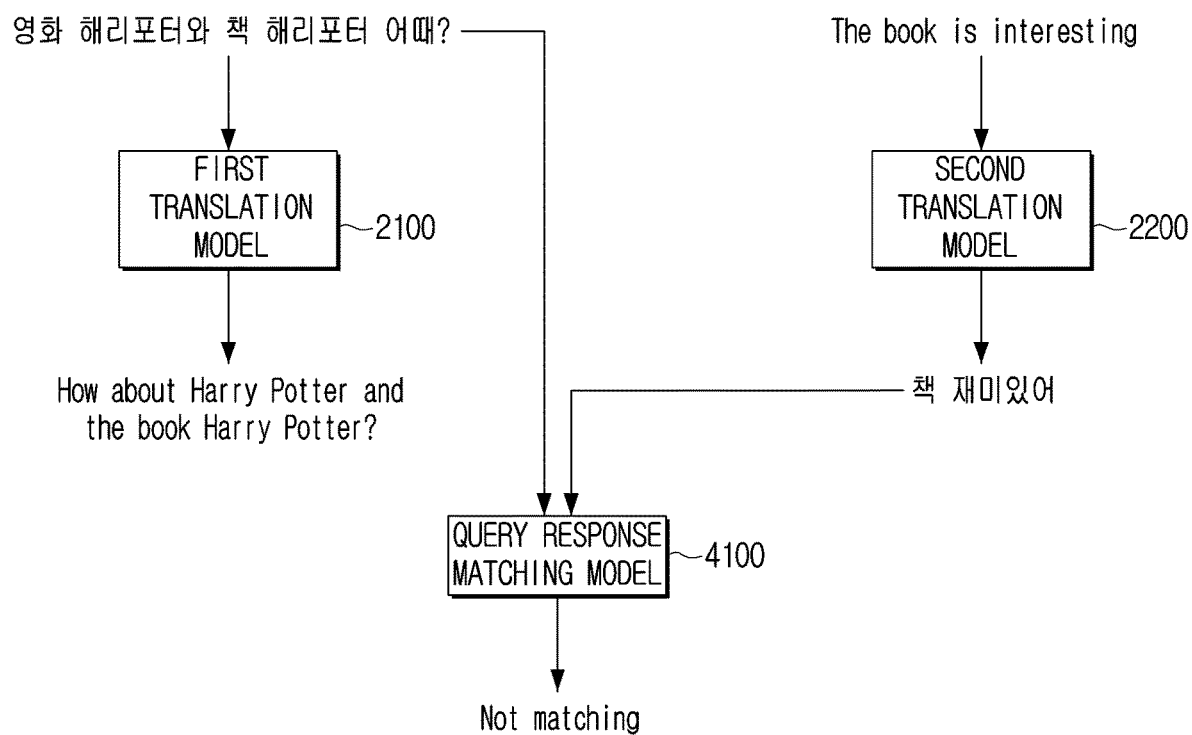
FIG. 4 is a diagram illustrating an example of identifying whether a first query text and a second response text match according to the disclosure.
Figure 5A:
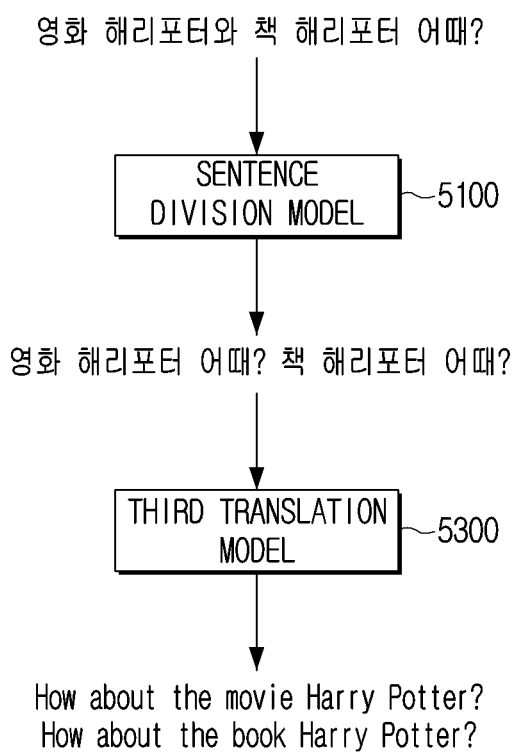
FIG. 5A is a diagram for describing a process of retranslating a first query text using a sentence division model according to the disclosure.
Figure 5B:
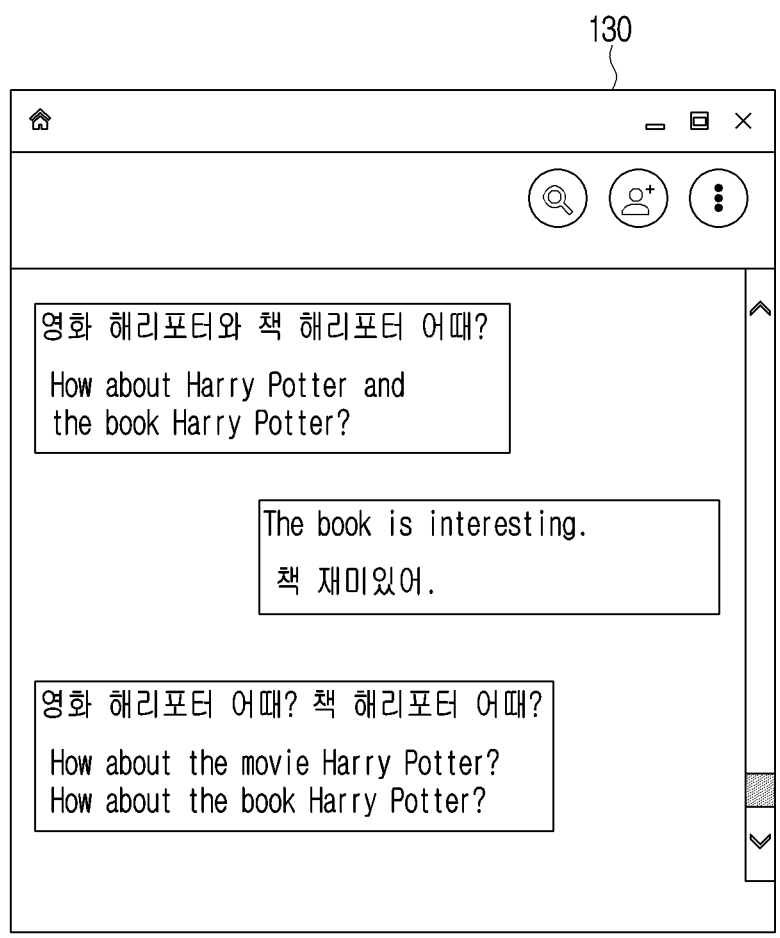
FIG. 5B is a diagram illustrating a method of retranslating and providing a first query text according to an embodiment of the disclosure.

When it is identified that the number of the first query text and the number of queries of the second query text are not the same, the query retranslation module 5000 may input the first query text into a sentence division model 5100 to acquire a fourth query text in which sentences are divided. FIGS. 4, 5A, and 5B are diagrams for describing a process of retranslating a first query text using a sentence division model 5100 according to an embodiment of the disclosure.

FIG. 4 is a diagram illustrating an example of identifying whether a first query text and a second response text match according to the disclosure.

Referring to FIG. 4, the translation module 2000 may input a query text of " 영화 해리포터와 책 해리포터 어때 ?" of a first language (Korean in this example) acquired through the query acquisition module 1000 into the first translation model 2100, and acquire "How about Harry Potter and the book Harry Potter?" of a second language (English in this example). In addition, the translation module 2000 may input a response text of "The book is interesting" of the second language acquired through the response acquisition module 3000 into the second translation model 2200, and acquire a response text of " 책 재미있어 " of the first language. Such a process may be displayed on the display 130 as illustrated in FIG. 5B.

In addition, the query retranslation module 5000 may input a query text of " 영화 해리포터와 책 해리포터 어때 ?" of the first language and the response text of " 책 재미있어 " of the first language into the query response matching model 4100, and identify whether the query text of the first language and the response text of the first language match.

Because the query and the response of " 영화 해리포터와 책 해리포터 어때 ?" and " 책 재미있어 " do not match, the query response matching model 4100 may identify that the query text of the first language and the response text of the first language that are input do not match.

FIG. 5A is a diagram for describing a process of retranslating a first query text using a sentence division model according to the disclosure.

When it is identified that the query text of the first language and the response text of the first language do not match through FIG. 4, the query retranslation module 5000 may input a query text of " 영화 해리포터와 책 해리포터 어때 ?" of the first language (which means "How about the movie Harry Potter and the book Harry Potter"?) into the sentence division model 5100, and acquire a query text of " 영화 해리포터 어때 ? 책 해리포터 어때 ?" (which means "How about the movie Harry Potter?" "How about the book Harry Potter?")_of the first language. The sentence division model 5100 is a neural network model that divides the query text of the first language to correspond to the number of queries. As an example, the sentence division model 5100 may perform learning by setting a learning query text of the first language and information on the number of queries of the corresponding learning query text as input data, and a learning query text of the first language divided to correspond to the number of queries of the learning query text as output data. In addition, the sentence division model 5100 may receive a query text of the first language and information on the number of queries of the corresponding query text, and output the query text of the first language divided so that the query text of the first language corresponds to the number of queries.

In addition, when the query text of " 영화 해리포터 어때 ? 책 해리포터 어때 ?" of the first language is acquired through the sentence division model 5100, the query retranslation module 5000 may input the query text of " 영화 해리포터 어때 ? 책 해리포터 어때 ?" of the first language into a third translation model 5300, and acquire a query text of "How about the movie Harry Potter? How about the book Harry Potter?" of the second language. The third translation model 5300 according to the disclosure is a neural network model for translating text of a first language into text of a second language. As an example, the third translation model 5300 may be the same neural network model as the first translation model 2100. However, the third translation model 5300 is not limited thereto, and may be implemented as a neural network model different from the first translation model 2100.

FIG. 5B is a diagram illustrating a method of retranslating and providing a first query text according to an embodiment of the disclosure.

As illustrated in FIG. 5A, when the query text of " 영화 해리포터 어때 ?" of the first language is retranslated and the query text of "How about the movie Harry Potter? How about the book Harry Potter?" of the second language is acquired, the processor 150 may provide the acquired query text. As an example, as illustrated in FIG. 5A, the processor 150 may control the display 130 to display the text " 영화 해리포터와 책 해리포터 어때 ?" of the first language and the text "How about the movie Harry Potter? How about the book Harry Potter?" of the second language on the display 130. In addition, the processor 150 may control the communication interface 120 to transmit the text " 영화 해리포터와 책 해리포터 어때 ?" of the first language and the text "How about the movie Harry Potter? How about the book Harry Potter?" of the second language displayed on the display 130 to an external device receiving the first response text.

As a second example, the query retranslation module 5000 may input the first query text into the third translation model 5300 and acquire a third query text of a second language different from the second query text.

Figure 6:
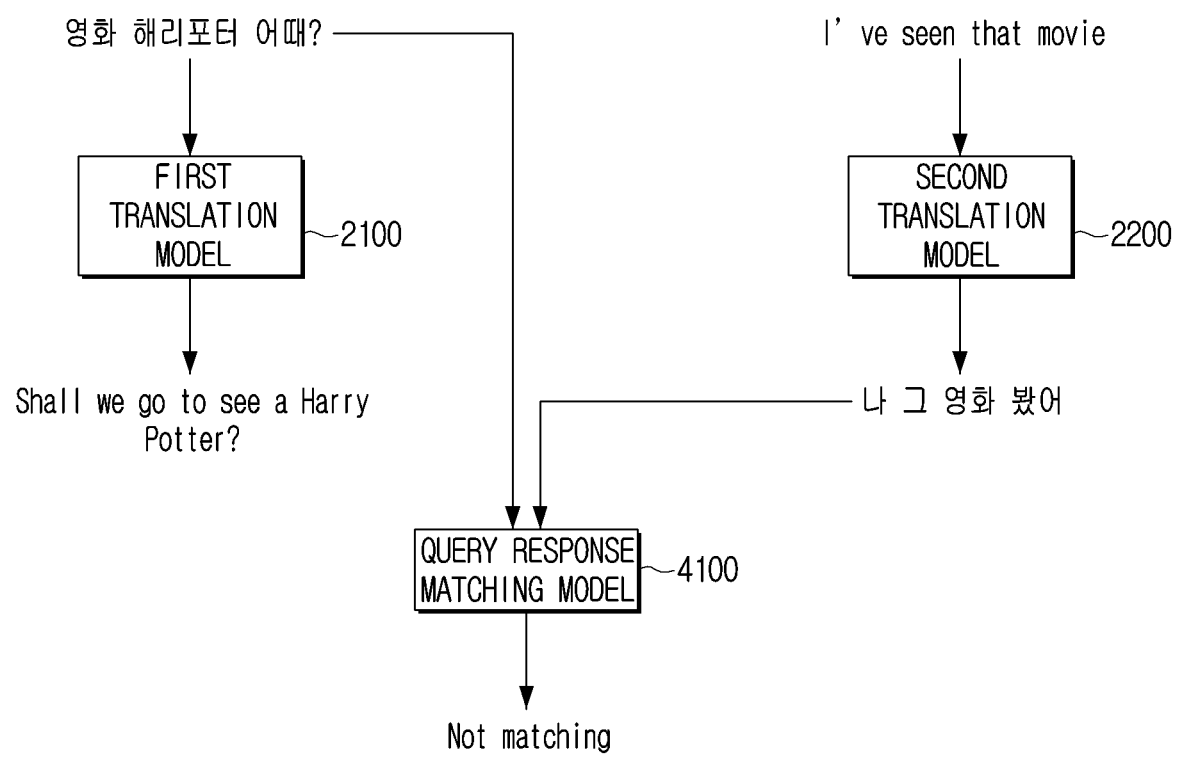
FIG. 6 is a diagram illustrating an example of identifying whether a first query text and a second response text match according to the disclosure.
Figure 7A:
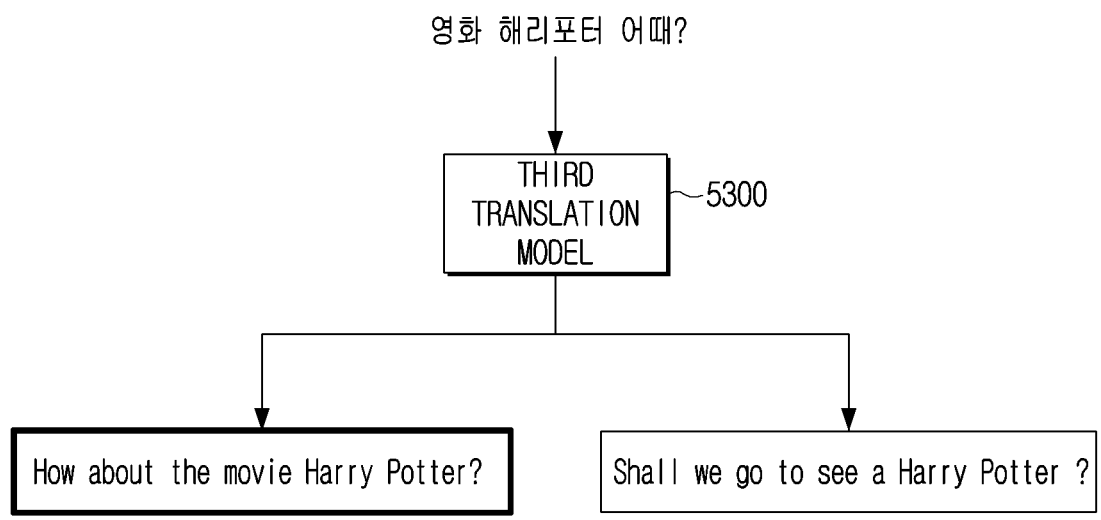
FIG. 7A is a diagram for describing a process of providing a query text different from a second query text using a third translation model according to the disclosure.
Figure 7B:
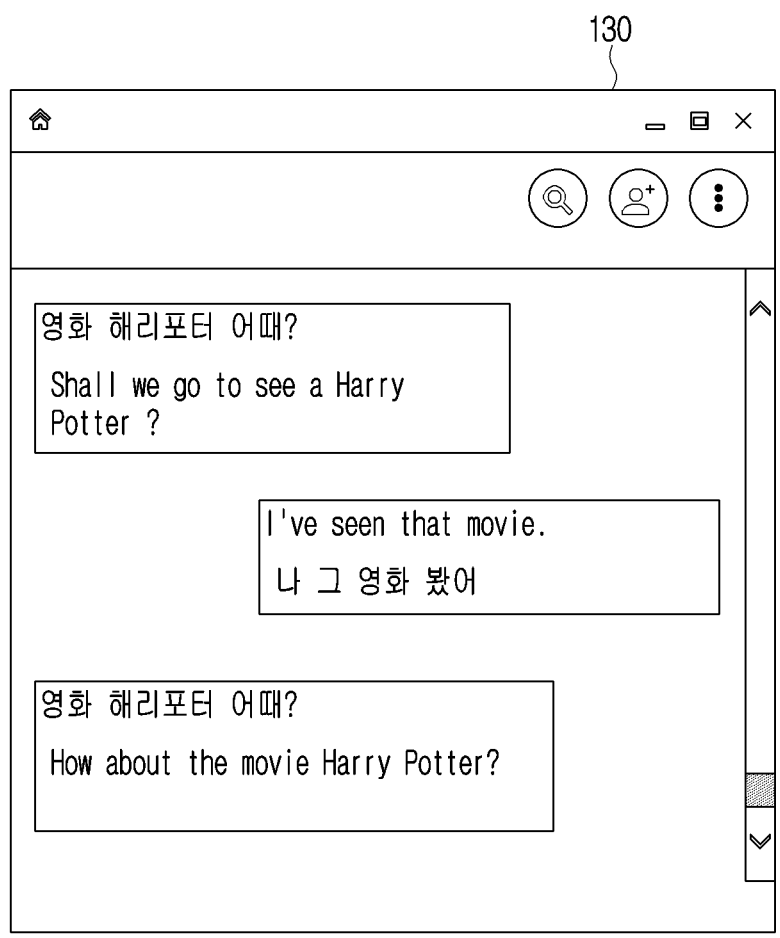
FIG. 7B is a diagram illustrating a method of retranslating and providing a first query text according to an embodiment of the disclosure.

As an example, when it is identified that the number of queries of the first query text and the second query text is the same, the query retranslation module 5000 may input the first query text into the third translation model 5300 and acquire a third query text of the second language different from the previously acquired second query text. As an example, the third query text may be a posterior translation result of the second query text that may be output by inputting the first query text into the third translation model 5300. FIGS. 6, 7A, and 7B are diagrams for describing a process of retranslating a first query text using the third translation model 5300 according to an embodiment of the disclosure.

FIG. 6 is a diagram illustrating an example of identifying whether a first query text and a second response text match according to the disclosure.

Referring to FIG. 6, the translation module 2000 may input a query text of " 영화 해리포터 어때 ?" (which is intended for "What do you think about the movie Harry Potter?) of a first language acquired through the query acquisition module 1000 into the first translation model 2100, and acquire "Shall we go to see a Harry Potter?" of a second language. As an example, "Shall we go to see a Harry Potter?" of the second language may be the highest priority translation result that may be acquired by inputting the query text of "영화 해리포터 어때?" of the first language into the first translation model 2100. That is, the first translation model 2100 may generate a plurality of candidate group texts in which the text of the first language is translated into the second language by receiving the text of the first language, and may output a candidate group text corresponding to the highest priority translation result among the plurality of candidate group texts as a translation result corresponding to the text of the first language.

In addition, the translation module 2000 may input a response text of "I've seen that movie" of the second language acquired through the response acquisition module 3000 into the second translation model 2200, and acquire a response text of "나 그 영화 봤어" of the first language. In addition, the query retranslation module 5000 may input the query text of "영화 해리포터 어때" of the first language and the response text of "나 그 영화 봤어" of the first language into the query response matching model 4100, and identify whether the query text of the first language and the response text of the first language match (e.g., whether the response text conforms to the intention of the query text).

As an example, in the case in which an intention of querying "영화 해리포터 어때" is to query about a commentary on the movie Harry Potter, because the response of "나 그 영화 봤어" (which means "I've seen that movie") to the query of "영화 해리포터 어때" does not match, the query response matching model 4100 may identify that the query text of the first language and the response text of the first language that are input do not match.

FIG. 7A is a diagram for describing a process of providing a query text different from a second query text using a third translation model according to the disclosure.

When it is identified that the query text "영화 해리포터 어때" of the first language and the response text "나 그 영화 봤어" of the first language do not match through FIG. 6, the query retranslation module 5000 may input the query text of "영화 해리포터 어때" of the first language into the third translation model 5300, and acquire the text "Shall we go to see a Harry Potter?" of the second language and the text "How about the movie Harry Potter?" of the second language. However, the query retranslation module 5000 is not limited thereto, and may compare the number of queries of the query text of "영화 해리포터 어때" of the first language and the number of queries of the query text "Shall we go to see a Harry Potter?" of the second language. When the number of queries is the same, the query retranslation module 5000 may input the query text of "영화 해리포터 어때" of the first language into the third translation model 5300, and acquire the text "Shall we go to see a Harry Potter?" of the second language and the text "How about the movie Harry Potter?" of the second language.

As an example, when the third translation model 5300 is implemented as the same neural network model as the first translation model 2100, the query retranslation module 5000 may identify the text "How about the movie Harry Potter?" of the second language, which is a posterior translation result of "영화 해리포터 어때" of the first language, as the third query text.

As an example, when the third translation model 5300 is implemented as a neural network model different from the first translation model 2100, the text "How about the movie Harry Potter?" of the second language may be output as the highest priority translation result of the third translation model 5300, and in this case, the query retranslation module 5000 may identify the text "How about the movie Harry Potter?" of the second language as the third query text.

FIG. 7B is a diagram illustrating a method of retranslating and providing a first query text according to an embodiment of the disclosure.

As illustrated in FIG. 7A, when the query text of "영화 해리포터 어때?" of the first language is retranslated and the query text of "How about the movie Harry Potter?" of the second language is acquired, the processor 150 may provide the acquired query text. As an example, as illustrated in FIG. 7B, the processor 150 may control the display 130 to display the text "영화 해리포터 어때?" of the first language and the text "How about the movie Harry Potter?" of the second language on the display 130. In addition, the processor 150 may control the communication interface 120 to transmit the text "영화 해리포터 어때?" of the first language and the text "How about the movie Harry Potter?" of the second language displayed on the display 130 to an external device receiving the first response text.

As a third example, the query retranslation module 5000 may input the first query text into a paraphrase model 5200 and acquire a fifth query text of a first language in which the first query text is paraphrased.

Figure 8A:
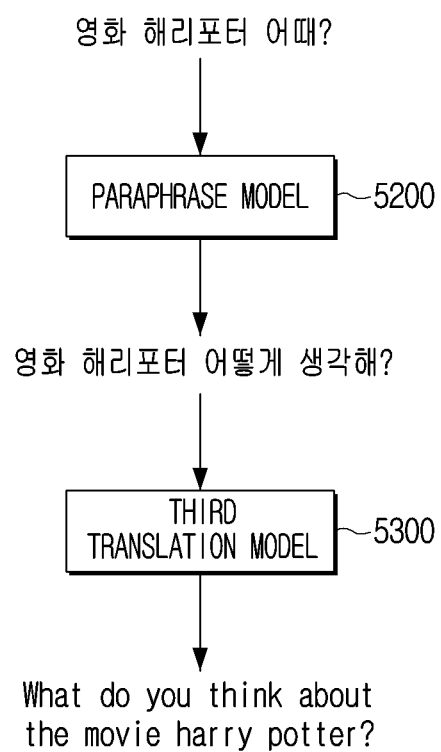
FIG. 8A is a diagram for describing a process of retranslating a first query text using a paraphrase model according to the disclosure.
Figure 8B:
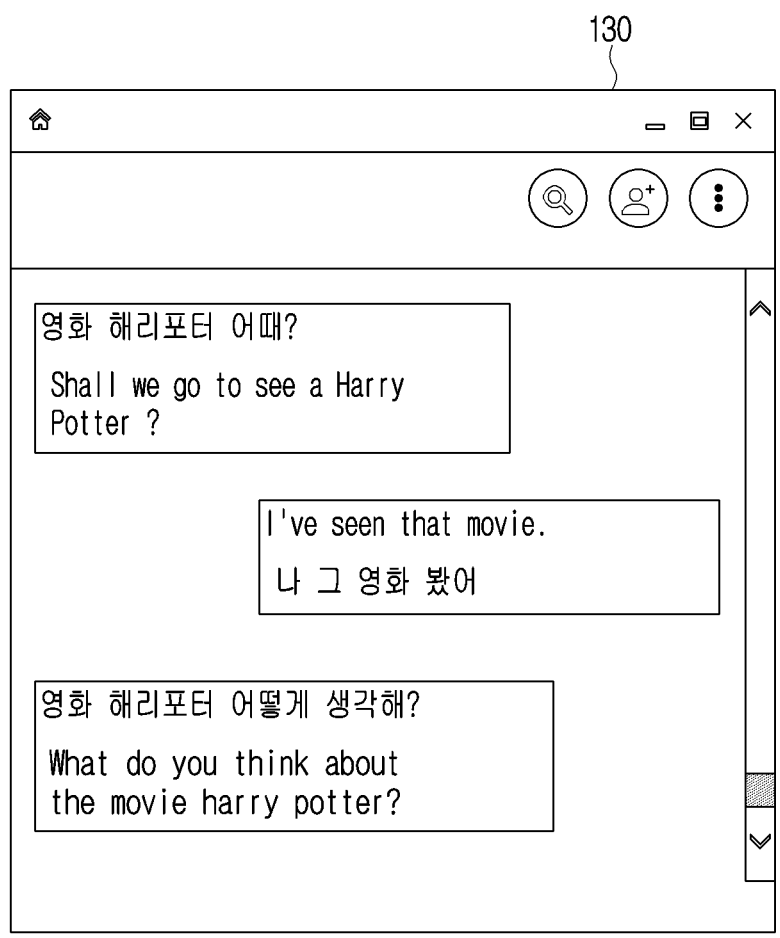
FIG. 8B is a diagram illustrating a method of retranslating and providing a first query text according to an embodiment of the disclosure.

As an example, when it is identified that the number of queries of the first query text and the number of queries of the second query text are the same, the query retranslation module 5000 may input the first query text into the paraphrase model 5200 and acquire the fifth query text of the first language in which the first query text is paraphrased. In addition, the query retranslation module 5000 may input the fifth query text into the third translation model 5300 and acquire a third query text of a second language. FIGS. 6, 8A, and 8B are diagrams for describing a process of retranslating a first query text using the paraphrase model 5200 and the third translation model 5300 according to an embodiment of the disclosure.

FIG. 8A is a diagram for describing a process of retranslating a first query text using a paraphrase model according to the disclosure.

When it is identified that the query text "영화 해리포터 어때" of the first language and the response text "나 그 영화 봤어" of the first language do not match through FIG. 6, the query retranslation module 5000 may input the query text of "영화 해리포터 어때" of the first language into the paraphrase model 5200, and acquire a query text "영화 해리포터 어떻게 생각해?" of the first language in which the text "영화 해리포터 어때" of the first language is paraphrased, as illustrated in FIG. 8A.

The paraphrase model 5200 according to the disclosure is a neural network model for paraphrasing and providing an input text. Specifically, the paraphrase model 5200 may perform learning by setting a learning text of the first language as input data, and setting a text of the first language having the same query intention as the input learning text as an output text.

When the query text of "영화 해리포터 어떻게 생각해?" of the first language in which the text of "영화 해리포터 어때" of the first language is paraphrased through the paraphrase model 5200 is acquired, the query retranslation module 5000 may input the query text of "영화 해리포터 어떻게 생각해" of the first language into the third translation model 5300, and acquire a query text of "What do you think about the movie Harry Potter?" of the second language.

FIG. 8B is a diagram illustrating a method of retranslating and providing a first query text according to an embodiment of the disclosure.

As illustrated in FIG. 8A, when the query text of "영화 해리포터 어때 ?" of the first language is retranslated and the query text of "What do you think about the movie Harry Potter?" of the second language is acquired, the processor 150 may provide the acquired query text. As an example, as illustrated in FIG. 8B, the processor 150 may control the display 130 to display the text "영화 해리포터 어때 ?" of the first language and the text "What do you think about the movie Harry Potter?" of the second language on the display 130. In addition, the processor 150 may control the communication interface 120 to transmit the text "영화 해리포터 어때 ?" of the first language and the text "What do you think about the movie Harry Potter?" of the second language displayed on the display 130 to an external device receiving the first response text.

In the embodiment described above, when it is identified that the query text of the first language and the response text of the second language do not match through the query response matching module 4000, the query retranslation module 5000 directly retranslates the query text of the first language, but the disclosure is not limited thereto.

As an example, when the response text of the second language is received from the external device and it is identified that the query text of the first language and the response text of the first language in which the response text of the second language is translated do not match, the processor 150 may further display a UI for checking whether to perform retranslation of the query text of the first language on the display 130. In addition, when a user input for performing retranslation of the query text of the first language is received through the UI, the processor 150 may retranslate the query text of the first language through the query response matching module 4000.

As an example, when the response text of the second language is received from the external device and it is identified that the query text of the first language and the response text of the first language in which the response text of the second language is translated do not match, the processor 150 may further display an icon for performing retranslation of the query text of the first language on the display 130. In addition, when a user input for selecting the icon is received, the processor 150 may retranslate the query text of the first language through the query response matching module 4000.

According to the embodiments described above, the electronic apparatus may improve the accuracy of translation by performing retranslation of a query according to whether a response to the query is matched.

Figure 9A:
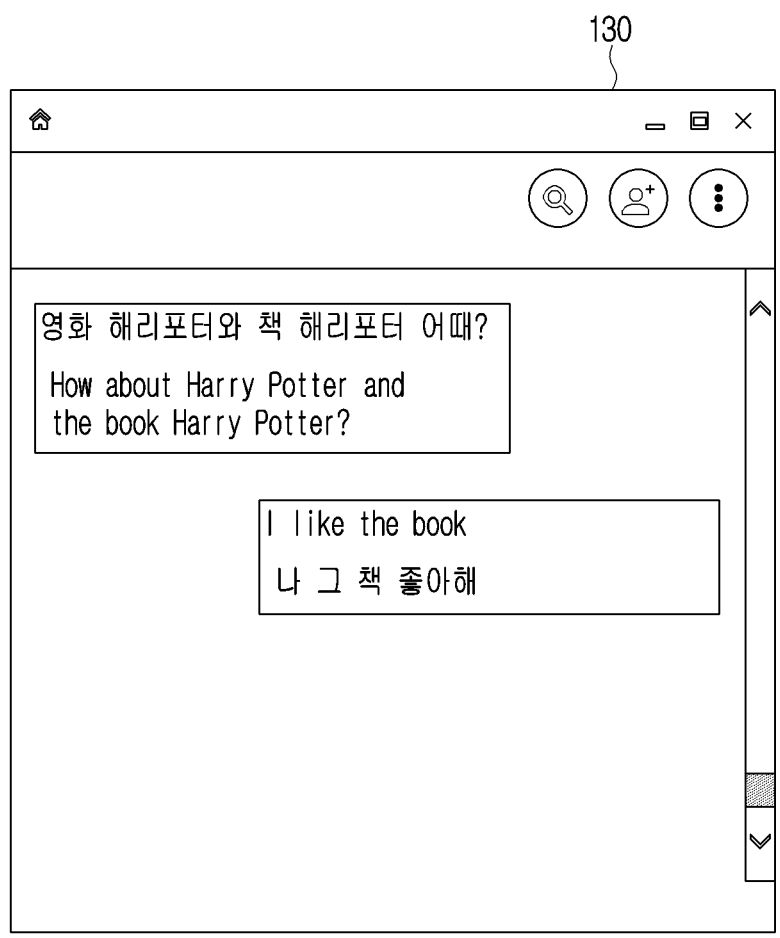
FIG. 9A is a diagram illustrating a response text including one response to a query text including two queries according to an embodiment of the disclosure.

FIG. 9A is a diagram illustrating a response text including one response to a query text including two queries according to an embodiment of the disclosure.

Referring to FIG. 9A, the electronic apparatus 100 may translate a first query text of "영화해리포터와 책해리포터어때 ?" of a first language, and acquire a second query text of "How about Harry Potter and the book Harry Potter?" of a second language according to the embodiments of the disclosure. In addition, the electronic apparatus 100 may transmit the text of "영화 해리포터와 해리포터와 책 ?" and the text of "How about Harry Potter and the book Harry Potter?" to the external device.

In addition, the electronic apparatus may receive a first response text of "I like the book" of the second language and a second response text of "나그책좋아해" of the first language in which the first response text is translated, from the external device. However, the disclosure is not limited thereto, and when the first response text of "I like the book" of the second language is received from the external device, the electronic apparatus 100 may translate the first response text and acquire the second response text of "나그책좋아해" of the first language.

In addition, the electronic apparatus 100 may identify whether the query and the response match, based on the first query text of "영화해리포터어때 ?" 책해리포터어때 ?" and the second response text of "나그책좋아해". As a result of identification, when the second response text includes only one response for two queries included in the first query text, the electronic apparatus 100 may identify that the first query text and the second response text do not match.

In addition, when it is identified that the first query text and the second response text do not match, the electronic apparatus 100 may acquire a third query text of a second language by retranslating the first query text.

Figure 9B:
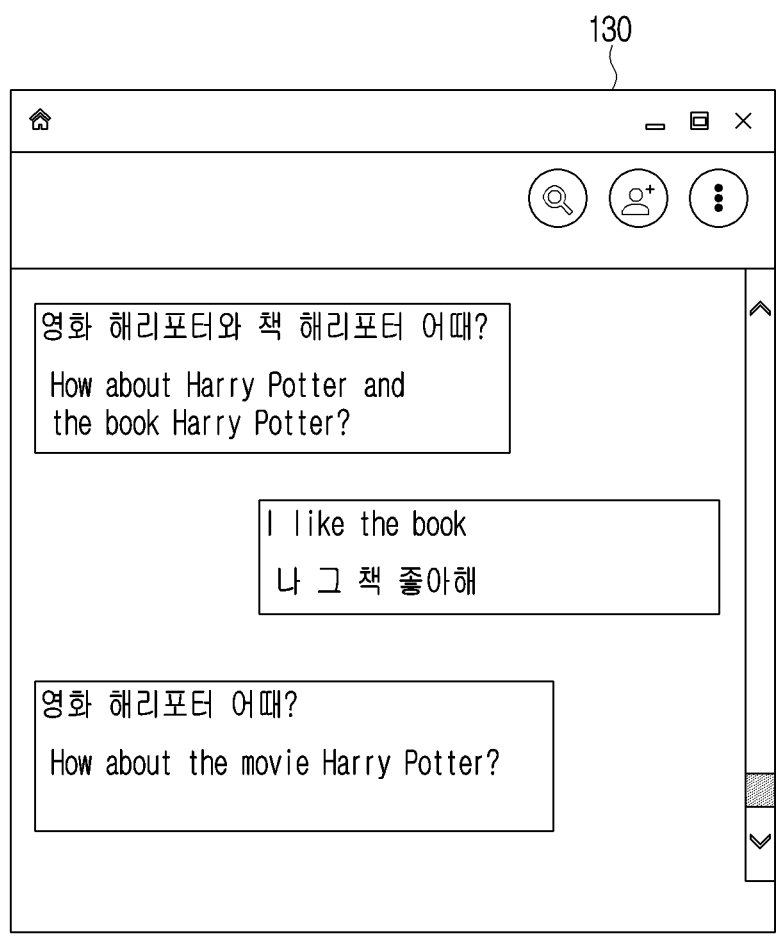
FIG. 9B is a diagram illustrating an example of performing retranslation of a query text based on a response text according to an embodiment of the disclosure.

FIG. 9B is a diagram illustrating an example of performing retranslation of a query text based on a response text according to an embodiment of the disclosure.

When it is identified that the first query text and the second response text do not match, the electronic apparatus 100 may input the first query text of "나그책좋아해 해리포터와 책 ?" into the sentence division model 5100, and acquire a fourth query text of "영화해리포터어때 ?" 및 "책해리포터어때" of the first language, as illustrated in FIG. 9A.

In addition, because the text of "책해리포터어때" in the fourth query text matches the second response text of "나그책좋아해" in the query and the response, the electronic apparatus 100 may acquire the third query text of "How about the movie Harry Potter?" of the second language by retranslating only the text of "영화해리포터어때 ?" in the fourth query text. In addition, the electronic apparatus 100 may transmit the text of "영화 해리포터어때 ?" and the text of "How about the movie Harry Potter?" to the external device receiving the first response text.

As in the embodiments described above, when the response text including only one response for the query text including a plurality of queries is provided, the electronic apparatus 100 may generate and provide a third query text corresponding to the rest of the queries, excluding a query in which the query and the response match among the plurality of queries.

Figure 10:
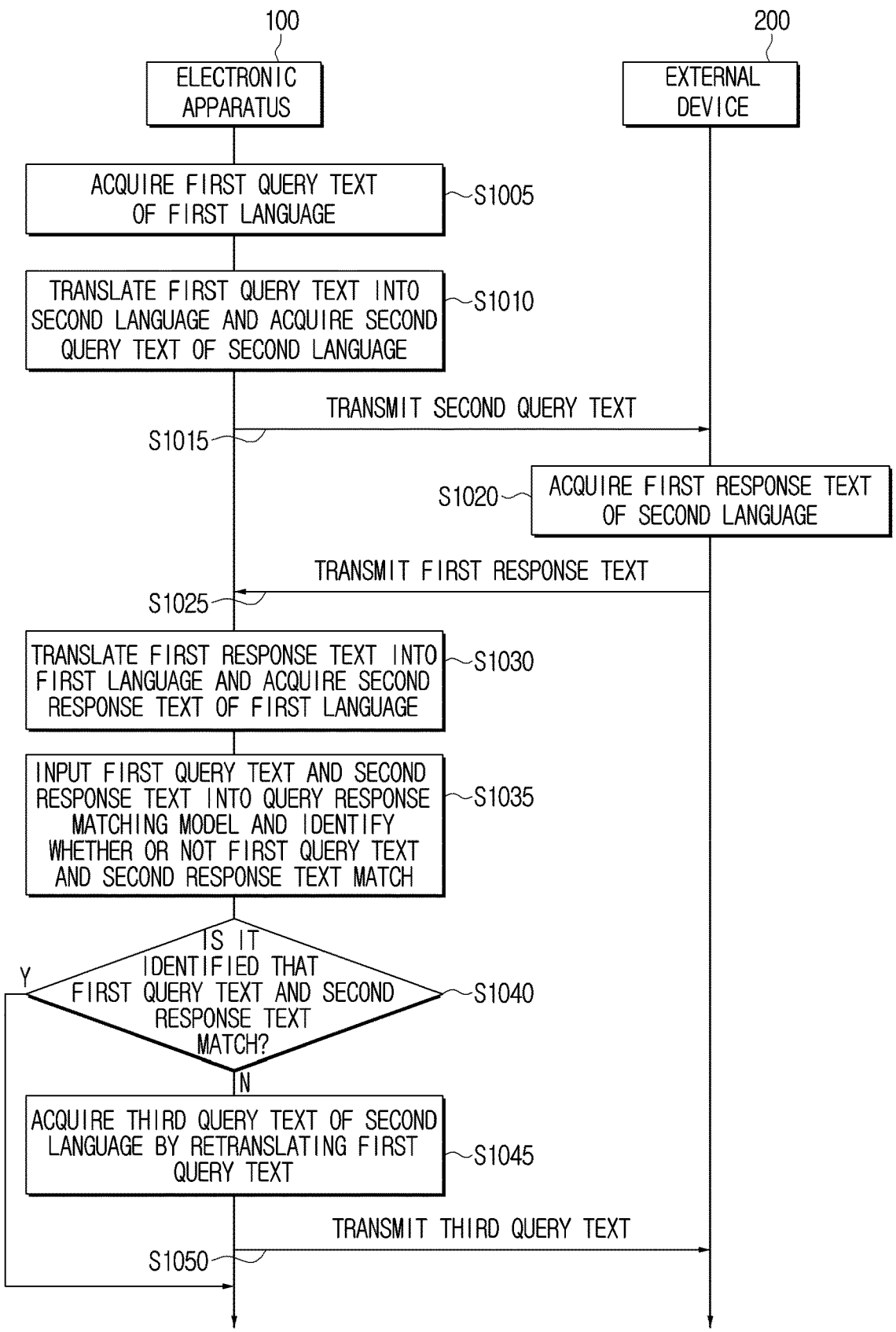
FIG. 10 is a sequence diagram for describing an operation between an electronic apparatus and an external device according to an embodiment of the disclosure.

FIG. 10 is a sequence diagram for describing an operation between an electronic apparatus and an external device according to an embodiment of the disclosure.

First, the electronic apparatus 100 may acquire a first query text of a first language (S1005). In addition, the electronic apparatus 100 may translate the first query text into a second language, and acquire a second query text of the second language (S1010).

If the second query text is acquired, the electronic apparatus 100 may transmit the second query text to an external device 200. However, the disclosure is not limited thereto, and the electronic apparatus 100 may transmit the second query text together with the first query text to the external device 200.

If the external device 200 receives the second query text, the external device 200 may acquire a first response text of the second language (S1020). In addition, the external device 200 may transmit the first response text to the electronic apparatus 100. If the electronic apparatus 100 receives the first response text, the electronic apparatus 100 may translate the first response text into the first language, and acquire a second response text of the first language (S1030). However, the disclosure is not limited thereto, and the external device 200 may translate the first response text into the first language and acquire the second response text, and may transmit the first response text and the second response text to the electronic apparatus 100.

If the second response text is acquired, the electronic apparatus may input the first query text and the second response text to the query response matching model 4100, and identify whether the query and the response match (S1035).

As a result of identification, if it is identified that the query and the response match (Y in S1040), the electronic apparatus 100 may end the process.

As the result of identification, when it is identified that the query and the response do not match (N in S1040), the electronic apparatus 100 may acquire a third query text of the second language by retranslating the first query text. A process of acquiring the third query text of the second language will be described in detail with reference to FIG. 11.

In addition, the third query text is acquired, the electronic apparatus 100 may transmit the third query text to the external device 200.

Figure 11:
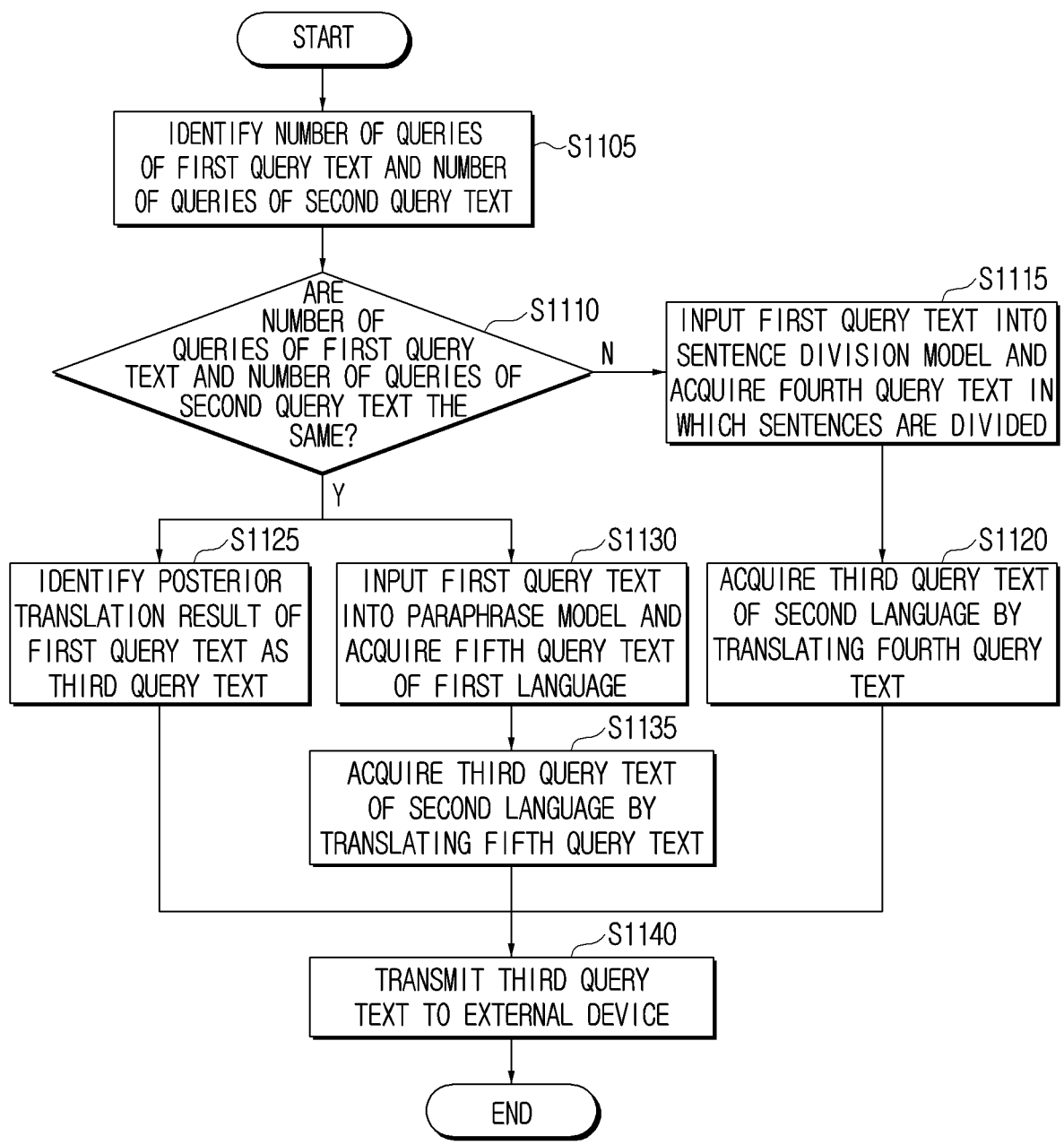
FIG. 11 is a flowchart for describing a process of acquiring a third query text by retranslating a first query text according to an embodiment of the disclosure.

FIG. 11 is a flowchart for describing a process of acquiring a third query text by retranslating a first query text according to an embodiment of the disclosure.

In FIG. 10, the electronic apparatus may input the first query text and the second response text to the query response matching model 4100, and identify whether the query and the response match (S1035). As the result of identification, when it is identified that the query and the response do not match (N in S1040), the electronic apparatus 100 may acquire the third query text of the second language through a process of FIG. 11.

Specifically, the electronic apparatus 100 may identify the number of queries of the first query text and the number of queries of the second query text (S1105). As an example, the electronic apparatus 100 may identify the number of queries of the query text by using a neural network model for identifying the number of queries of the query text. As an example, the neural network model for identifying the number of queries of the query text may perform learning by setting a learning text including a plurality of queries as an input text and the number of queries of the input learning text as an output text. However, the disclosure is not limited thereto, and the number of queries may be identified through various methods for identifying the number of queries of the query text.

If the number of queries of the first query text and the number of queries of the second query text are identified, the electronic apparatus 100 may identify whether the number of queries of the first query text and the number of queries of the second query text are the same (S1110).

If the number of queries of the first query text and the number of queries of the second query text are not the same (N in S1110), the electronic apparatus 100 may input the first query text into the sentence division model 5100, and acquire a fourth query text in which sentences are divided (S1115). In addition, the electronic apparatus 100 may translate the fourth query text, and acquire the third query text of the second language (S1120). As an example, the electronic apparatus 100 may translate the fourth query text using the third translation model 5300, and acquire the third query text of the second language. If the third query text is acquired, the electronic apparatus 100 may transmit the third query text to the external device (S1140).

If the number of queries of the first query text and the number of queries of the second query text are the same (Y in S1100), the electronic apparatus 100 may identify a posterior translation result for the first query text as the third query text (S1125). That is, the second query text may be the highest priority translation result for the first query text of the first translation model 2100, and the posterior translation result of the first translation model 2100 for the second query text may be identified as the third query text. As an example, the electronic apparatus 100 may identify the posterior translation result for the first query text as third query text by using the same third translation model as the first translation model 2100. However, the disclosure is not limited thereto, and the electronic apparatus 100 may identify the highest priority translation result acquired by translating the first query text as the third query text by using the third translation model different from the first translation model 2100. If the third query text is acquired, the electronic apparatus 100 may transmit the third query text to the external device (S1140).

If the number of queries of the first query text and the number of queries of the second query text are the same (Y in S1110), the electronic apparatus 100 may input the first query text into the paraphrase model 5200, and acquire a fifth query text of the first language (S1130). In addition, the electronic apparatus 100 may translate the fifth query text, and acquire the third query text of the second language (S1135). Specifically, As an example, the electronic apparatus 100 may input the fifth query text into the third translation model 5300, and identify the highest priority result that may be acquired as the third query text. If the third query text is acquired, the electronic apparatus 100 may transmit the third query text to the external device (S1140).

FIG. 12 is a flowchart for describing a method for controlling an electronic apparatus according to an embodiment of the disclosure.

Referring to FIG. 12, the electronic apparatus 100 may acquire a first query text of a first language (S1210). As an example, the electronic apparatus 100 may acquire the first query text of the first language through the input interface 110.

If the first query text is acquired, the electronic apparatus 100 may translate the first query text into a second language, and acquire a second query text of the second language. As an example, the electronic apparatus 100 may input the first query text into the first translation model 2100 for translating the first language into the second language and acquire the second query text of the second language, and the second query text may be the highest priority translation result of the first translation model.

If the second query text is acquired, the electronic apparatus 100 may transmit the second query text to the external device (S1230). In addition, the electronic apparatus 100 may acquire a first response text of the second language corresponding to the second query text from the external device (S1240).

If the first response text is acquired, the electronic apparatus 100 may input a second response text acquired by translating the first response text into the first language and the first query text into a neural network model that identifies whether the query and the response match, and identify whether the first query text and the second response text match in the query and the response (S1260). The neural network model for identifying whether the query and the response match may be implemented as the query response matching model 4100 of FIG. 1.

In addition, as an identification result, if it is identified that the first query text and the second response text do not match, the electronic apparatus 100 may acquire a third query text of the second language by retranslating the first query text.

If it is identified that the first query text and the second response text do not match, the electronic apparatus 100 may identify the number of queries of the first query text and the number of queries of the second query text, respectively. Specifically, the electronic apparatus 100 may input each of the first query text and the second query text into a neural network model for identifying the number of queries, and identify the number of queries of the first query text and the number of queries of the second query text, respectively. In addition, the neural network model for identifying the number of queries may perform learning by setting a learning text including a plurality of queries as input data and the number of queries of the input learning text as output data.

As a first example, when the number of queries of the first query text and the number of queries of the second query text are different, the electronic apparatus 100 may acquire a fourth query text of the first language in which the first query text is divided based on the number of queries corresponding to the number of queries of the first query text, and may acquire the third query text by translating the fourth query text into the second language. Specifically, the electronic apparatus 100 may input the first query text into the sentence division model for dividing sentences so that the query text corresponds to the number of queries, and acquire the fourth query text of the first language. As an example, the sentence division model may perform learning by setting a learning query text of the first language and information on the number of queries of the corresponding learning query text as input data, and a learning query text of the first language divided to correspond to the number of queries of the learning query text as output data.

As a second example, when the number of queries of the first query text and the number of queries of the second query text are the same, the electronic apparatus 100 may acquire a third query text of the second language different from the second query text by translating the first query text into the second language, and the third query text may be a posterior translation result of the second query text. Specifically, the second query text may be the highest priority translation result of the first translation model, and the third query text may be a posterior translation result of the first translation model.

As a third example, when the number of queries of the first query text and the number of queries of the second query text are the same, the electronic apparatus 100 may input the first query text into the paraphrase model 5200 for re-generating the query text, and acquire a fifth query text of the first language in which the first query text is paraphrased. In addition, the electronic apparatus 100 may acquire a third query text acquired by translating the fifth query text into the second language. As an example, the paraphrase model may perform learning by setting a learning text of the first language as input data, and a text of the first language having the same query intention as the input learning text as an output text.

In addition, as an example, the electronic apparatus 100 may display the first query text and the second query text on the display 130. In addition, when the first response text is acquired from the external device, the electronic apparatus 100 may display the first response text and the second response text on the display 130. In addition, when the third query text is acquired, the electronic apparatus 100 may display the third query text on the display 130.

Because the embodiments may be variously modified and have several embodiments, specific embodiments are illustrated in the drawings and described in detail in the detailed description. However, it is to be understood that it is not intended to limit the scope to the specific embodiment, but includes various modifications, equivalents, and/or alternatives according to the embodiments of the disclosure. Throughout the accompanying drawings, similar components will be denoted by similar reference numerals.

In describing the disclosure, when a detailed description for the known functions or configurations related to the disclosure may unnecessarily obscure the gist of the disclosure, the detailed description thereof is omitted.

In addition, the embodiments described above may be modified to several different forms, and the scope and spirit of the disclosure are not limited to the embodiments. Rather, these embodiments make the disclosure thorough and complete, and are provided in order to completely transfer the technical spirit of the disclosure to those skilled in the art.

Terms used in the disclosure are used only to describe specific embodiments and are not intended to be limiting of the scope. Singular expressions include plural expressions unless the context clearly indicates otherwise.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may refer to all cases (1) including at least one A, (2) including at least one B, or (3) including both at least one A and at least one B.

Expressions "first", "second", and the like, used in the disclosure may indicate various components regardless of a sequence and/or importance of the components, will be used only in order to distinguish one component from the other components, and do not limit the corresponding components.

When it is mentioned that any component (e.g., a first component) is (operatively or communicatively) coupled with/to or is connected to another component (e.g., a second component), it is to be understood that any component is directly coupled with/to another component or may be coupled with/to another component through the other component (e.g., a third component).

On the other hand, when it is mentioned that any component (e.g., a first component) is "directly coupled with/to" or "directly connected to" to another component (e.g., a second component), it is to be understood that the other component (e.g., a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware.

Instead, in any context, an expression "a device configured to" may mean that the device is "capable of" together with other devices or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

In the embodiments, a 'module' or a '~er/or' may perform at least one function or operation, and be implemented as hardware or software or be implemented as a combination of hardware and software. In addition, a plurality of 'modules' or a plurality of '~ers/ors' may be integrated in at least one module and be implemented as at least one processor except for a 'module' or an '~er/or' that needs to be implemented as specific hardware.

On the other hand, various elements and regions in the drawings are schematically illustrated. Therefore, the technical spirit of the disclosure is not limited by relatively sizes or intervals illustrated in the accompanying drawings.

Meanwhile, the diverse embodiments described above may be implemented in a computer or similar device readable recording medium using software, hardware, or a combination of thereof. According to a hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, the embodiments described in the disclosure may be implemented as the processor itself. According to software implementation, the embodiments such as procedures and functions described in the disclosure may be implemented as separate software modules. Each of the software modules may perform one or more functions and operations described in the disclosure.

Meanwhile, the method according to the diverse embodiments of the disclosure described above may be stored in a non-transitory readable medium. The non-transitory readable medium may be mounted and used in various apparatuses.

The non-transitory readable medium is not a medium that stores data for a short time such as a register, a cache, a memory, or the like, but means a machine readable medium that semi-permanently stores data. Specifically, the programs for performing the various methods described above may be stored and provided in the non-transitory readable medium such as a compact disk (CD), a digital versatile disk (DVD), a hard disk, a Blu-ray disk, a universal serial bus (USB), a memory card, a read only memory (ROM), or the like.

According to an embodiment, the method according to the diverse embodiments disclosed in the disclosure may be included and provided in a computer program product. The computer program product may be traded as a product between a seller and a purchaser. The computer program product may be distributed in the form of a storage medium (for example, a compact disc read only memory (CD-ROM)) that may be read by a device, or online through an application store (for example, PlayStore™). In the case of the online distribution, at least a portion of the computer program product may be at least temporarily stored in a storage medium such as a memory of a server of a manufacturer, a server of an application store, or a relay server, or be temporarily generated.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modified implementations should not be individually understood from the technical idea or perspective of the disclosure.

What is claimed is:

1. A method for controlling an electronic apparatus, the method comprising:
    translating, by the electronic apparatus, a first query text of a first language to acquire a second query text of a second language;
    transmitting, by the electronic apparatus, the acquired second query text to an external device;
    acquiring, from the external device, a first response text of the second language in response to the second query text;
    acquiring, by the electronic apparatus, a second response text acquired by translating the first response text into the first language, and identifying whether the second response text semantically matches to the first query text by inputting the second response text and the first query text into a first neural network model that identifies whether or not a query and a response semantically match; and
    acquiring, by the electronic apparatus, a third query text of the second language by retranslating the first query text based on a result of identifying that the first query text and the second response text do not semantically match,
    wherein the acquiring the third query text includes:
        identifying, by the electronic apparatus, a first number of queries included in the first query text and a second number of queries included in the second query text, based on the result of identifying that the first query text and the second response text do not semantically match;
        based on a result of identifying that the first number is different from the second number, acquiring, by the electronic apparatus, a fourth query text of the first language by dividing the first query text based on the first number of queries included in the first query text; and
        acquiring, by the electronic apparatus, the third query text by translating the fourth query text into the second language,
    wherein the method further comprises:
        acquiring, by the electronic apparatus, a fifth query text of the first language in which the first query text is paraphrased by inputting the first query text into a paraphrase neural network that generates a paraphrased query text, based on a result of identifying that the first number is equal to the second number; and
        acquiring, by the electronic apparatus, the third query text by translating the fifth query text into the second language,
        wherein the paraphrase neural network performs learning by using a learning text of the first language as input data, and a text of the first language having a query intention that is same as a query intention of the input learning text as an output text.

2. The method as claimed in claim 1, wherein the first number and the second number are identified by respectively inputting the first query text and the second query text into a second neural network model that identifies a number of queries included in a query text, and
    wherein the second neural network model that performs learning by using a learning text including a plurality of queries as input data, and a number of queries included in the input learning text as output data.

3. The method as claimed in claim 1, wherein the fourth query text of the first language is acquired by inputting the first query text into a sentence division model that divides a query text such that divided query texts respectively correspond a number of queries included in the query text; and
wherein the sentence division model performs learning by using a learning query text of the first language and information on a number of queries included in the learning query text as input data, and a learning query text obtained by division to correspond to the number of queries included in the learning query text as output data.

4. The method as claimed in claim 1, further comprising acquiring, by the electronic apparatus, the third query text of the second language, which is semantically different from the second query text, by translating the first query text into the second language, based on a result of identifying that the first number is equal to the second number,
wherein the third query text is a posterior translation result of the second query text.

5. The method as claimed in claim 4, wherein the second query text of the second language is acquired by inputting the first query text into a first translation model that translates the first language into the second language, and
wherein the second query text is a highest priority translation result of the first translation model, and the third query text is a posterior translation result of the first translation model.

6. The method as claimed in claim 1, further comprising displaying, by the electronic apparatus, the first query text and the second query text on a display of the electronic apparatus,
wherein the acquiring the first response text and the acquiring the second response text comprise displaying the first response text and the second response text on the display, and
wherein the acquiring the third query text of the second language comprises displaying the third query text on the display.

7. An electronic apparatus comprising:
a communication interface;
a memory configured to store at least one instruction; and
a processor configured to execute the at least one instruction stored in the memory to:
translate a first query text of a first language to acquire a second query text of a second language;
control the communication interface to transmit the acquired second query text to an external device;
control the communication interface to receive, from the external device, a first response text of the second language in response to the second query text;
acquire a second response text acquired by translating the first response text into the first language, and identify whether the second response text semantically matches to the first query text by inputting the second response text and the first query text into a first neural network model that identifies whether or not a query and a response semantically match; and
acquiring a third query text of the second language by retranslating the first query text based on a result of identifying that the first query text and the second response text do not semantically match,
wherein the processor is further configured to:
identify a first number of queries included in the first query text and a second number of queries included in the second query text, respectively, based on a result of identifying that the first query text and the second response text do not semantically match;
based on a result of identifying that the first number is different from the second number, acquire a fourth query text of the first language by dividing the first query text based on the first number of queries included in the first query text; and
acquire the third query text by translating the fourth query text into the second language,
acquire a fifth query text of the first language in which the first query text is paraphrased by inputting the first query text into a paraphrase neural network that generates a paraphrased query text, based on a result of identifying that the first number is equal to the second number; and
acquire the third query text by translating the fifth query text into the second language,
wherein the paraphrase neural network performs learning by using a learning text of the first language as input data, and a text of the first language having a query intention that is same as a query intention of the input learning text as an output text.

8. The electronic apparatus as claimed in claim 7, wherein the processor is further configured to identify the first number and the second number, by respectively inputting the first query text and the second query text into a second neural network model that identifies a number of queries, and
wherein the second neural network model that performs learning by using a learning text including a plurality of queries as input data, and a number of queries included in the input learning text as output data.

9. The electronic apparatus as claimed in claim 7, wherein the processor is further configured to acquire the fourth query text of the first language by inputting the first query text into a sentence division model that divides a query text such that divided query texts respectively correspond to a number of queries included in the query text, and
wherein the sentence division model performs learning by using a learning query text of the first language and information on a number of queries included in the learning query text as input data, and a learning query text obtained by division to correspond to the number of queries included in the learning query text as output data.

10. The electronic apparatus as claimed in claim 7, wherein the processor is further configured to acquire the third query text of the second language, which is semantically different from the second query text, by translating the first query text into the second language, based on a result of identifying that the first number is equal to the second number, and
wherein the third query text is a posterior translation result of the second query text.

11. The electronic apparatus as claimed in claim 10, wherein the processor is further configured to acquire the second query text of the second language by inputting the first query text into a first translation model that translates the first language into the second language, and
wherein the second query text is a highest priority translation result of the first translation model, and the third query text is a posterior translation result of the first translation model.

* * * * *